(12) United States Patent
Perlo et al.

(10) Patent No.: US 7,252,265 B2
(45) Date of Patent: Aug. 7, 2007

(54) MICROAIRCRAFT AND CELLULAR PHONE EQUIPPED WITH MICROAIRCRAFT

(75) Inventors: Piero Perlo, Sommariva Bosco (IT); Bartolomeo Pairetti, Barge (IT); Roberto Finizio, Orbassano (IT); Cosimo Carvignese, Orbassano (IT); Piermario Repetto, Turin (IT); Denis Bollea, Fiano (IT); Davide Capello, Turin (IT)

(73) Assignee: S.I.SV El Societa' Italinana per Lo Sviluppo Dell' Elettronica S.p.A. (IT)

( * ) Notice: Subject to any disclaimer, the term of this patent is extended or adjusted under 35 U.S.C. 154(b) by 0 days.

(21) Appl. No.: 10/964,764

(22) Filed: Oct. 15, 2004

(65) Prior Publication Data

US 2006/0038059 A1     Feb. 23, 2006

(30) Foreign Application Priority Data

Oct. 17, 2003    (IT) .......................... TO2003A0823

(51) Int. Cl.
*B64C 27/08* (2006.01)

(52) U.S. Cl. ..................... 244/17.23; 244/1 R; 244/4 R

(58) Field of Classification Search ................ 244/4 R, 244/6, 7 R, 12.1, 17.11, 17.17, 17.23, 17.25, 244/1 R, 114 R, 900
See application file for complete search history.

(56) References Cited

U.S. PATENT DOCUMENTS

| | | | | |
|---|---|---|---|---|
| 2,951,661 A | * | 9/1960 | Dorman et al. ............ 244/23 R |
| 2,954,614 A | * | 10/1960 | Vogt ............................ 434/33 |
| 3,045,951 A | * | 7/1962 | Freeland ................... 244/23 C |
| 3,387,456 A | * | 6/1968 | Feder et al. .................. 60/204 |
| 4,043,421 A | * | 8/1977 | Smith ......................... 180/117 |
| 4,880,071 A | * | 11/1989 | Tracy ......................... 180/117 |
| 5,082,079 A | | 1/1992 | Lissaman et al. |
| 6,260,796 B1 | * | 7/2001 | Klingensmith ............ 244/23 R |
| 6,568,630 B2 | * | 5/2003 | Yoeli ......................... 244/23 R |
| 6,626,078 B2 | * | 9/2003 | Thornton ..................... 89/1.13 |
| D496,606 S | * | 9/2004 | Sanders, Jr. .................. D12/5 |
| 6,817,570 B2 | * | 11/2004 | Yoeli ......................... 244/12.1 |
| 6,824,095 B2 | * | 11/2004 | Mao ........................... 244/12.5 |
| 6,866,478 B2 | * | 3/2005 | Fabian et al. ............ 415/198.1 |
| 2002/0104921 A1 | * | 8/2002 | Louvel ...................... 244/12.1 |
| 2003/0068034 A1 | | 4/2003 | Silvester |
| 2003/0106959 A1 | * | 6/2003 | Fukuyama ................ 244/23 R |
| 2005/0125151 A1 | * | 6/2005 | Lee ............................ 701/213 |
| 2005/0242231 A1 | * | 11/2005 | Yoeli ......................... 244/23 R |

FOREIGN PATENT DOCUMENTS

| | | |
|---|---|---|
| DE | 100 14 899 A1 | 9/2001 |
| EP | 0 279 391 A2 | 8/1888 |
| WO | WO 02/09396 A2 | 1/2002 |
| WO | WO 03/061155 A1 * | 7/2003 |

OTHER PUBLICATIONS www.answers.com, "cellular telephone", pp. 1-15.*

(Continued)

*Primary Examiner*—Stephen A. Holzen
(74) *Attorney, Agent, or Firm*—Sughrue Mion, PLLC

(57) ABSTRACT

An aircraft which is attachable to, for example, a cellular phone. The aircraft is provided with at least four rotors actuated with compressed fluid or by ring-shaped electric motors.

11 Claims, 3 Drawing Sheets

OTHER PUBLICATIONS www.halfbakery:cell phone remote control, p. 1 of 1, Aug. 28, 2002.*
Kroo, Ilan, "Mesicopter: A Meso-Scale Flgiht Vehicle for Atmoshperic Sensing", Jul. 31, 1998, pp. 1-11.*
Ilan Presentation: "Approach: Rotor Optimization", pp. 1-10.*
Kroo et al, Presentation: "The Mesicopter", pp. 1-10.*
The Mesicopter: A Meso-Scale flight Vehicle, NIAC Phase I Final Report, pp. 1-24.*
www.wikipedia.org, "Miniature UAVs", pp. 1-8.*
Miniature Aerial Vehilcles Research, www.defense-updates.com, pp. 1-3.*
http://adg.stanford.edu/mesicopter/ProgressReports/MesicopterProgressJun00.html, Mesicopter Progress Report, Jun. 2000, pp. 1-8.*
www.vectorsite.net/twuav17.html, "[17.0] Miniature UAVs", pp. 1-11.*
www.auvsi.org/iraq/deserthawk.cfm, "Unmanned Systems Committed to Iraqi War", pp. 1-2.*
www.wikipedia.org, "Micor Air Vehicle", pp. 1-2.*
www.theregister.com, "Honey, I shurnk the surveillance plane!", pp. 1-2, Feb. 26, 2004.*
www.defenselink.mil, "DARPA Selects Micro Air Vehicle Contactor", Dec. 12, 1997, pp. 1-2.*
Morrison, Gale; "Power Transmission and Motion Control", Tecnology Focus Part 2, www.memagazine.org, Nov. 1998.*
S. J. Mraz: "Honey, I Shrunk the Plane" Machine Design, Penton, Inc. Cleveland, US, vol. 70, No. 18, Oct. 8, 1998, pp. 35-38, 40. 42 XP000880608, ISSN: 0024-9114.

* cited by examiner

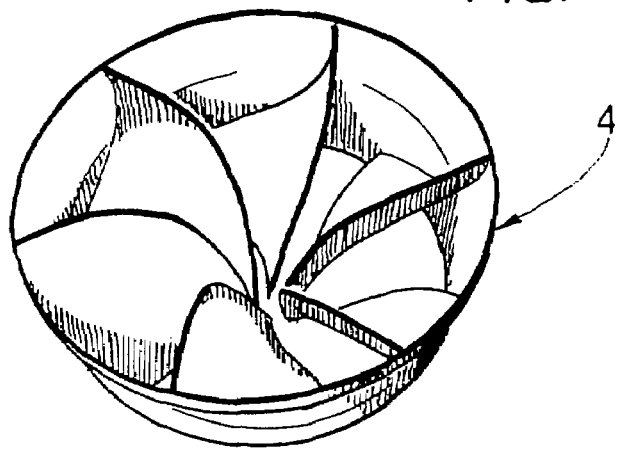
FIG. 5
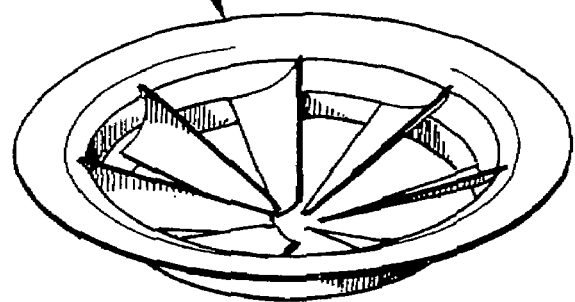
FIG. 6
FIG. 7
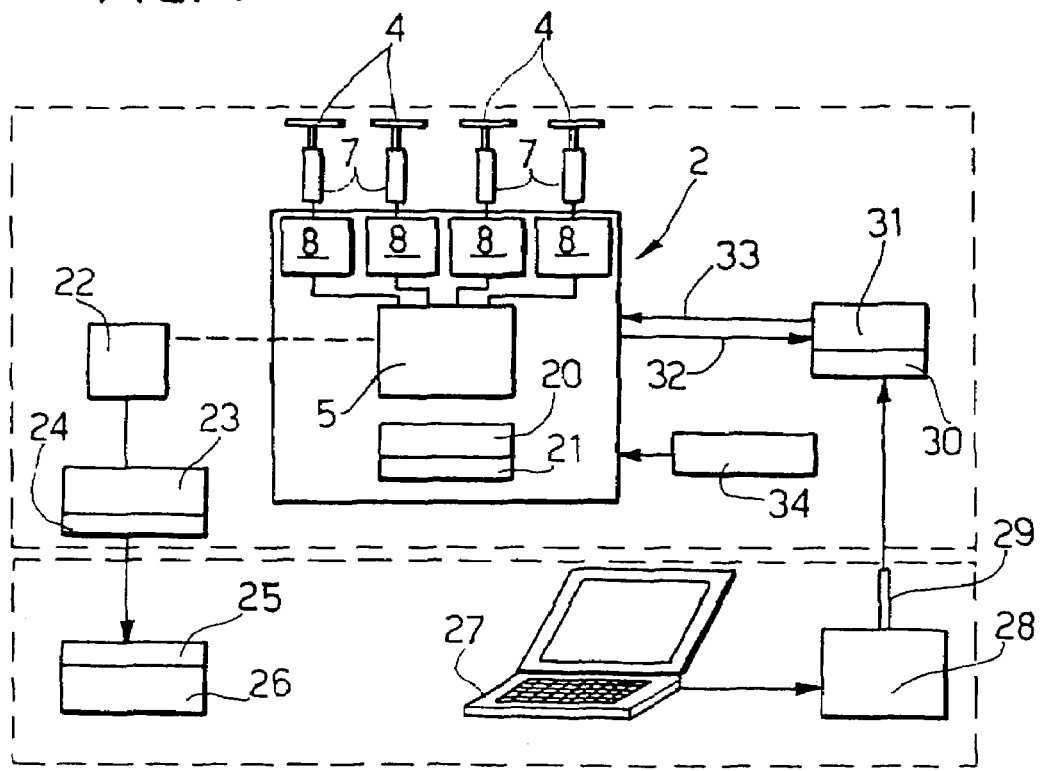

MICROAIRCRAFT AND CELLULAR PHONE EQUIPPED WITH MICROAIRCRAFT

SUMMARY OF THE INVENTION

The present invention relates to a microaircraft comprising a basically flat body having at least four ring-shaped microrotors, basically co-planar and arranged on the vertices of a quadrilateral, motor means for controlling said microrotors and an electronic microcontroller for controlling said motor means.

In a preferred embodiment, the aforesaid microrotors are compressed air turbines and the aforesaid motor means comprise a combustion microchamber for a nano-particle fuel and one or more nozzles associated to each microturbine for directing onto the latter one or more shock fronts generated inside the combustion microchamber.

In an alternative embodiment, the motor means are made up of a ring-shaped electric motor for each of the micromotors, each microrotor constituting the rotor of a corresponding electric motor.

The invention also relates to a cellular phone to which a microaircraft as referred to above is connected in a removable way. The cellular phone is equipped with means for remote control of the air-craft. Preferably, the microaircraft is provided with multimedia means, such as for instance a miniature camera and a microphone, and can therefore transmit audio and video messages to the guest mobile phone or also to other cellular systems and Internet networks.

The control means of the four microrotors of the microaircraft are designed to control said microrotors independently from one another or in pairs. Preferably, the microaircraft is controlled by generating a clockwise rotation on the two ring-shaped microturbines placed on two opposite vertices of the quadrilateral, and a counter-clockwise rotation on the other two microturbines. The aircraft has four degrees of freedom. By changing simultaneously or differentially the speed of the microturbines, it is possible to obtain a vertical motion (upwards and downwards), a lateral motion (right or left), a horizontal motion (forwards and backwards) or a rotation around a yaw axis.

The vertical motion is controlled by increasing or decreasing simultaneously the power of all four microturbines. The lateral motion is controlled by increasing the power of two turbines on the same side of the quadrilateral with respect to the other two. For instance, by increasing the speed of the turbines on the left the aircraft shifts towards the right. In the same manner, a power increase of the two back or front turbines causes a forward or backward motion, respectively. The fourth degree of freedom is controlled by the induced moment generated by rotor resistance. This moment acts in the opposite direction with respect to rotor rotation. In order to eliminate aircraft yaw, the sum of all induced moments should be zero. However, if a set of rotors, for instance those turning clockwise, arranged on the vertices of the quadrilateral, increases its rotational speed, the resulting induced moment will generate a counter-clockwise rotation of the aircraft.

In the specific case in which propulsion is obtained with electric motors, in a preferred embodiment the microaircraft uses commercially available thin film batteries or microfuel cells.

BRIEF DESCRIPTION OF THE DRAWINGS

Further characteristics and advantages of the invention shall be evident from the following description with reference to the accompanying drawings, provided as mere non-limiting examples, in which:

FIGS. 5, 6 are perspective views of possible embodiments of each microrotor, and FIG. 7 is a block diagram of the control system of the microaircraft according to the invention.

DETAILED DESCRIPTION OF THE INVENTION

Figure 1:
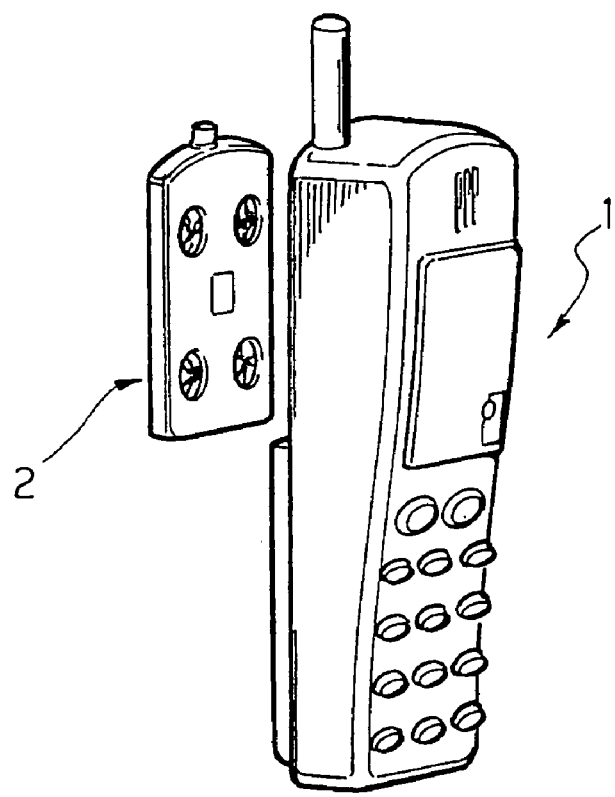
FIG. 1 is a perspective front view of a cellular phone-microaircraft assembly according to the invention, in disassembled condition.
Figure 2:
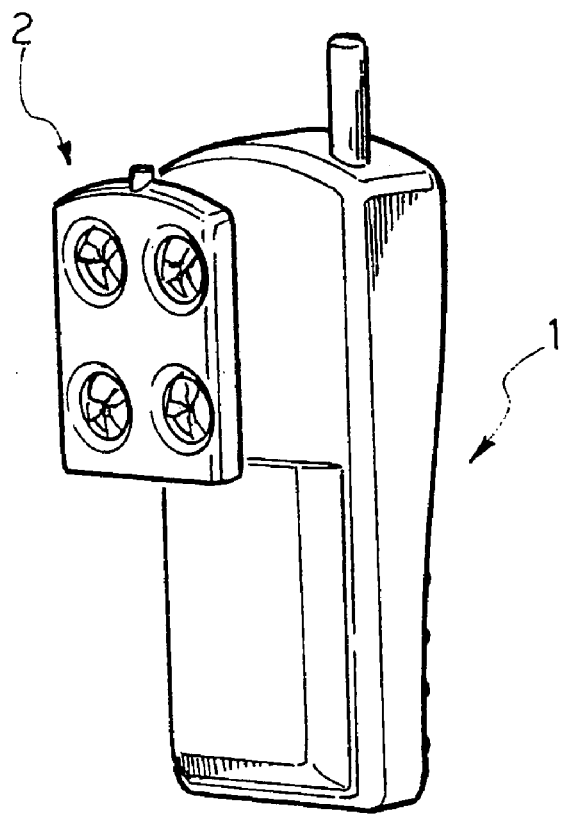
FIG. 2 is a perspective rear view of the assembly of FIG. 1.
Figure 3:
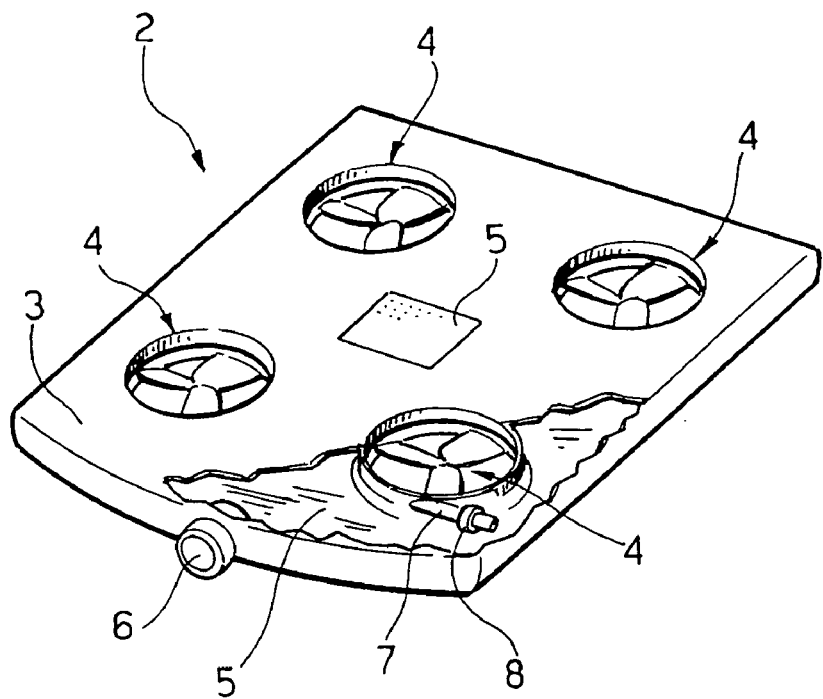
FIG. 3 is a magnified, partially sectioned perspective view of the microaircraft belonging to the assembly of FIGS. 1, 2.
Figure 3A:
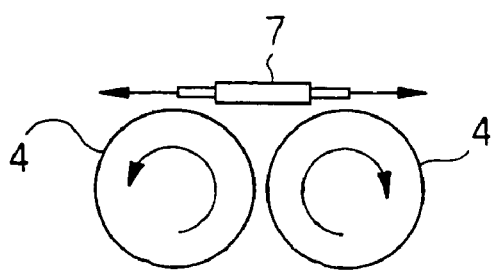
FIG. 3A shows a variant of a detail of the embodiment of FIG. 3, where a same combustion micro-chamber is provided with two nozzles for controlling two turbines.

With reference to FIGS. 1 and 2, number 1 globally refers to a microcellular phone provided with means for the removable connection of a microaircraft 2. Cellular phones today, can reach transmission rates up to 2 megabits per second, i.e. 200 times more with respect to the limits of a GSM system, thus enabling high definition audio and video transmissions. The success of said standard as global mobile communication standard allows a virtual connectivity worldwide. The microaircraft 2 comprises, as shown in FIG. 3, a basically flat body 3 with four microrotors 4 arranged on the vertices of a quadrilateral, basically co-planar one to the other. A compressed gas (or air) tank 5 supplied through a valve 6 is defined inside the body 3. Each microrotor 4 is associated to one or more nozzles 7 connected to a combustion microchamber 8, in which a nano-particle fuel generates a microcombustion causing one or more shock fronts for controlling each microrotor. The nozzles 7 can be arranged on the two opposite ends of the same combustion microchamber placed between two adjacent turbines (FIG. 3A), so as to control both turbines. The system for obtaining a pulsed jet can be of "valveless" or "detonation" type. The rotor of each microturbine can be of "magnetic lift" type.

Figure 4:
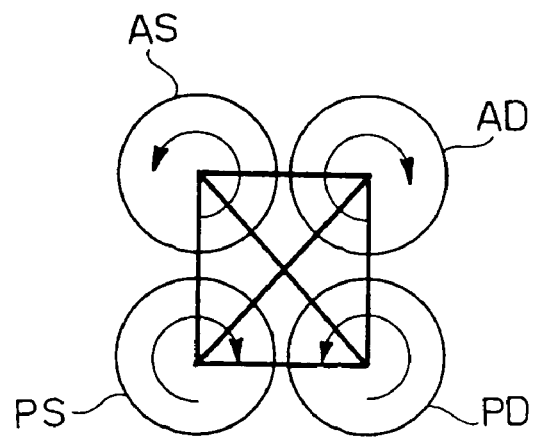
FIG. 4 is a diagram showing the control criterion applied to the four microrotors of the microaircraft.

In FIG. 4 the microrotors 4 are referred to in short with AS (front left), AD (front right), PS (rear left) and PD (rear right). The two rotor pairs AS, PD and AD, PS are rotated in opposite directions, as shown in FIG. 4, so as to ensure the reciprocal cancellation of yaw moments. As already mentioned above, the vertical, lateral, horizontal motion and a yaw rotation are obtained by means of a selective control of the rotation speed of the four microrotors.

FIGS. 5, 6 are perspective views of two possible embodiments of each microrotor 4.

According to an alternative embodiment, each rotor 4 is a ring-shaped stator of a ring-shaped electric motor.

The body 3 of the microaircraft houses an electronic microcontroller 5, which communicates at a distance with the cellular phone 1. Multimedia means are further arranged on board the microaircraft, such as a miniature camera, a microphone or various sensors transmitting audio and video messages to the guest mobile phone or to other cellular systems or Internet networks.

FIG. 7 shows the structure of the control system in which two main elements can be identified, i.e. the microaircraft 2 and the base station. The microaircraft 2 comprises the four microrotors 4 with their control motors 7 controlled by means of an electronic speed controller 8 by a microprocessor 5. The latter communicates by means of sensors 20 and a GPS antenna 21 at radio frequency with the mobile phone or an Internet station, which send control data, whereas the aircraft transmits audio-video data. Said result is achieved by means of one or more miniature cameras 22 connected through a video transmitter 23 and an antenna 24 with the antenna 25 of a video base receiver 26. The miniature cameras (CCD or CMOS) are also designed as dynamic view sensors. Control signals are sent by the control station 27 or by the mobile phone by means of a R/C transmitter 28 and a transmitting antenna 29, so as to be received by means of an antenna 30 by a data receiver 31 receiving a power line 32 and transmitting to the microprocessor 5 on a four-channel line 33. The microaircraft is eventually associated to a battery assembly 34.

The microprocessor is the core of the microaircraft. It receives input signals from on-board sensors and video information from cameras and sends output signals for electronic speed controllers of the microturborotors. As was already said, in an alternative version with respect to compressed air motors, said motors can be ring-shaped electric motors. A preferred characteristic of the invention is the use of compressed air turborotors supercharged by means of microcombustions.

A self-charge function of turborotors and of ring-shaped electric motors can be provided by means of wind energy.

As was already said, a thin film battery or a microfuel cell can be used.

Obviously, though the basic idea of the invention remains the same, construction details and embodiments can widely vary with respect to what has been described and shown by mere way of example, however without leaving the framework of the present invention.

What is claimed is:

1. An aircraft in combination with a cellular phone, the aircraft comprising:
    a body having at least four ring-shaped co-planar rotors;
    a plurality of motors, each motor operative to control a respective one of said rotors; and
    an electronic controller operative to control said plurality of motors,
    wherein, the aircraft is attachable to at least a portion of the cellular phone in a removable manner, and
    wherein the aircraft is smaller in size than the cellular phone, such that when the aircraft is attached to the cellular phone, the aircraft forms a removable wall portion of the cellular phone.

2. The combination according to claim 1, wherein said rotors are gas turbines and each of said plurality of motors comprises a combustion chamber for a nano-particle fuel and one or more nozzles associated to each respective gas turbine for directing onto each respective gas turbine one or more shock fronts generated inside the combustion chamber.

3. The combination according to claim 1, wherein each motor includes a ring-shaped electric motor for each respective rotor.

4. The combination according to claim 1, wherein the rotors are of a magnetic lift type.

5. The combination according to claim 1, wherein said cellular phone is configured to remotely control said aircraft.

6. The combination according to claim 5, wherein the aircraft is provided with a camera and a microphone, such that the aircraft can transmit audio and video messages to said cellular phone or to other cellular systems and Internet networks.

7. The combination according to claim 6, wherein said plurality of motors control said four rotors of the aircraft independently from one another.

8. The combination according to claim 7, wherein said rotors are gas turbines and the aircraft is controlled by generating a clockwise rotation on two of said gas turbines which are arranged in opposition to each other, and a counter-clockwise rotation is generated on another two of said gas turbines also arranged in opposition to each other.

9. The combination according to claim 8, wherein said plurality of motors are operative to vary, simultaneously or differentially, a speed of the gas turbines so as to obtain an upward and downward vertical motion, a right and left lateral motion, a forward and backward horizontal motion or a rotation around a yaw axis, said vertical motion being controlled by increasing or decreasing, simultaneously, the power of all four gas turbines, the lateral and horizontal motion being controlled by increasing the power of two gas turbines provided next to each other, and the yaw moment being controlled by rotating at different speeds the rotors turning in a direction with respect to rotors turning in an opposite direction.

10. The combination according to claim 6, wherein the aircraft uses thin film batteries or fuel cells.

11. The combination according to claim 6, wherein the aircraft uses cameras (CCD or CMOS) designed as dynamic view sensors.

* * * * *